July 2, 1963 K. H. LANGE 3,095,792
CAMERA ACCESSORY SHOE ARRANGEMENT
Filed Aug. 3, 1960
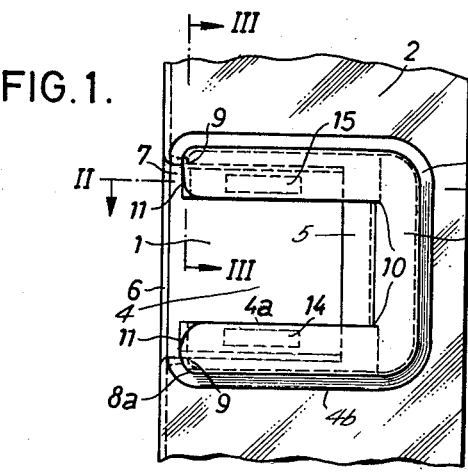
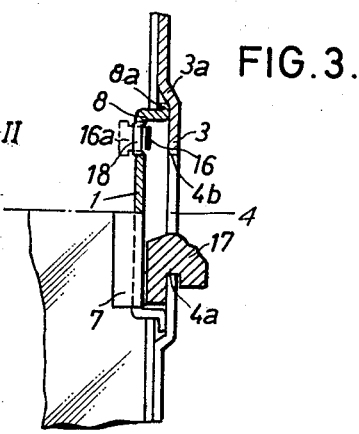
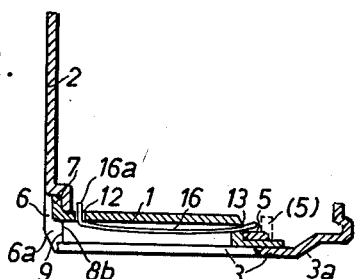
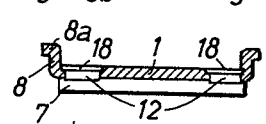
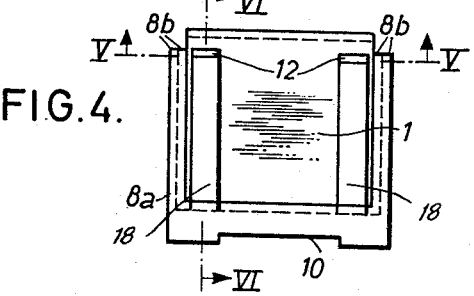
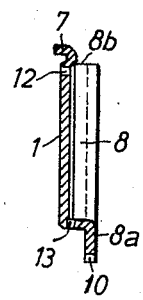
INVENTOR:
Karl Heinz Lange
By Maxwell E. Sparrow
Attorney

United States Patent Office 3,095,792
Patented July 2, 1963

3,095,792
CAMERA ACCESSORY SHOE ARRANGEMENT
Karl Heinz Lange, Bunde-Ennigloh, Westphalia, Germany, assignor to Balda-Kamerawerk Rudolf Gruter, Kommanditgesellschaft, Bunde, Westphalia, Germany, a German company
Filed Aug. 3, 1960, Ser. No. 47,228
Claims priority, application Germany Sept. 3, 1959
11 Claims. (Cl. 95—11)

It has become general practice to provide all photographic cameras with an accessory shoe arrangement for fitting to the camera, accessories such as, for example, flashlights, range finders, exposure meters and so on. The accessory shoe, which has a guide way to receive the foot of an accessory, is generally made separately from, and is riveted or screwed to, the camera top, and is made either from suitably profiled drawn material or, alternatively, is stamped or pressed from sheet metal. In the former case the costs are considerable, and in the second case difficulties are experienced with regard to tool production, since the material forming the shoe has to be bent, thus forming a relatively weak edge and the fit of the foot or base of an accessory in the guideway of the shoe can be maintained only with difficulty. The gaps between the shoe and the camera top tend also to be unsightly and inconvenient. Apart from these two forms of camera accessory shoe, other shoe constructions have also been disclosed wherein the shoe and the entire camera top are produced by pressure diecasting. In such cases, the presence of gaps at the surface of the camera top can be avoided. However, the undercuts, which provide the guideway of the shoe, render the die-casting operation difficult, and in addition particular difficulties are experienced with this process in connection with chromium-plating of the casting. Moreover, the strength is less than that of a sheet metal camera top owing to the fact that cast material is relatively brittle.

One object of this invention is to provide an accessory shoe arrangement in which the aforementioned difficulties are overcome or at least reduced.

According to the invention, there is provided a camera accessory shoe arrangement comprising a guideway to receive a foot portion of an accessory wherein the guideway is formed between the camera top and a plate, said camera top being shaped, preferably by stamping out or pressing, so as to locate the foot portion laterally, wherein the plate, which has been produced by a simple pressing or drawing operation, is inserted from the interior of the camera top with a portion thereof engaged through a corresponding opening in said camera top, and wherein the plate and the camera top are secured together by bending a tongue carried by one of them into engagement with the other.

This type of accessory shoe arrangement is very reliable and yet simple to produce. It has an aesthetic appearance as a result of the absence of gaps in the main part of the camera top and particularly since fastening is effected without rivets or screws. This also contributes to economy in production.

In order that the invention may be more readily understood, one embodiment of the same will now be described by way of example and with reference to the accompanying drawings, in which:

FIGURE 1 is a plan view of a camera top having an accessory shoe in accordance with the invention;

FIGURE 2 is a section through the accessory shoe on the line II—II in FIGURE 1;

FIGURE 3 is a view partly in elevation and partly in section on the line III—III in FIGURE 1;

FIGURE 4 is a plan view of the accessory shoe;

FIGURE 5 is a section on the line V—V in FIGURE 4; and

FIGURE 6 is a section on the line VI—VI in FIGURE 4.

In contradistinction to accessory shoe constructions known hitherto, an accessory shoe arrangement constructed in accordance with the invention includes a plate 1, which is shown in detail in FIGURES 4 to 6 and is fastened beneath a camera top 2 in a very simple manner, without screws or rivets. For this purpose the camera top 2 is formed by pressing to provide a raised or recessed portion 3 which is U-shaped in plan and which serves as an upper slide guide. During the pressing operation an inclined transitional portion 3a and an aperture 4 are formed, this aperture 4 being open at one end, towards the back of the camera. The edges 4a and 4b of the aperture 4 serve to guide the base or foot portion of an accessory (not shown in detail). A lug or tongue 5 is provided at the end of the aperture 4 remote from the rear of the camera and is initially directed downwardly into the interior of the camera, perpendicularly to the camera top 2, in the manner shown in broken lines 5'. Adjacent the open end of the aperture 4 a recess 6 is formed to interlock with downwardly directed tab 7 on the plate 1. The plate 1 has a peripheral flange 8 around three sides thereof, the depth of the flange 8 determining the depth of the guideway into which the foot 17 of the accessory slides. The flange 8 has an outwardly directed lip 8a and each end edge 8b of the flange 8 lies, when the plate 1 is inserted, in the position shown in FIGURES 1 to 3, at the side of the recess 6, against the edge 9 of the side wall 6a of the recess 6, and thus, in conjunction with the lug 7, helps to prevent any displacement of the plate 1. The difference in height between the top of the flange 8a and the upper surface of the main part of the plate 1 determines, in the manner already indicated, the depth of the guideway into which the foot 17 of the accessory is inserted. Any lateral displacement is prevented by the fact that the lug 7 is a tight fit between the side walls 6a of the recess 6. A cut-out 10 is provided in the lip 8a at the front of the plate 1 and engages the tongue 5 of the camera top 2 and thus serves to secure this edge of the plate against lateral displacement.

During assembly the plate 1 is inserted upwardly from the interior of the camera top 2 with the lug 7 at such an angle that it may be passed through the opening constituted by the recess 6 and hooked over the wall of the latter, this being facilitated by the shaping of the edges 11 as shown in FIGURE 1.

The plate 1 is then pivoted into its final position upwardly into the recess constituted by the raised portion 3. The lip 8a now bears against the inner surface of the portion 3, and to secure the plate 1 in this final position the lug 5 has only to be folded over.

In order to avoid any play of the foot 17 of the accessory in the space between the plate 1 and the camera top 2, bent leaf springs 16 are provided, each of which is T-shaped at one end 16a. Before the insertion of the plate 1 these springs 16 are threaded through apertures 12 and 13 and are located in grooves 18, formed by pressing, in the plate 1. After the plate 1 has been fixed in position the leaf springs 16 cannot be removed since the camera top 2 prevents their being bent to a sufficient extent. However, it is possible to dispense with springs and use the inherent elasticity of the camera top 2 to prevent undue play. This is facilitated by the fact that the plate 1 and the camera top 2 are secured to one another only at their front and rear ends so that the two edges 4a and 4b of the aperture 4 may be bowed or deflected a certain amount. In such a case the raised portion 3 may conveniently be slightly deformed to provide downwardly directed projections as indicated by dotted lines at 14 and 15 in FIGURE 1.

Apart from the advantages already indicated, the advantages of the arrangement described are that the plate 1 can be made by a single manufacturing operation, and can, therefore, be easily mass-produced. Similarly the co-operating raised portion 3 can also be formed easily by stamping or pressing the camera top 2.

In the case of a camera top which is chromium or otherwise plated it is possible that the plating might peel off when the lug 5 is bent over, but this is unimportant since it would occur only on the inside of the camera top 2.

If the plate 1 and the camera top are secured to one another by means of a lug on the plate 1 instead of a lug on the camera top, it is advisable to make the latter of rust-proof sheet metal.

The accessory shoe arrangement above described may be modified in a large number of different ways. For example, the aperture 4 may be stamped out without a raised portion 3 being formed. In this case the plate 1 is disposed wholly below the upper surface of the camera top so that the latter may be completely smooth without any unsightly projections or elements. This would be particularly the case if the controls were shifted to the underside of the camera. In this connection an important consideration with regard to the manufacturing process is that the decision whether the plate 1 is mounted wholly below the level of the camera top or whether the latter is to have a raised portion 3 does not affect the construction of the plate 1 since, in either case, the distance between the lip 8a and the upper surface of the main part of the plate 1 determines the inside depth of the slide guide.

I claim:

1. In a camera case having a top, a rectangular opening in said top, a plate below said opening and a bent tongue on said top; a camera accessory shoe arrangement comprising a guideway for receiving a foot portion of said accessory, said guideway being formed between said top and said plate, and said opening in said top having a raised border portion locating said foot portion laterally, said plate being inserted from the inside of said camera case and being secured to said top by said bent tongue thereof.

2. In a camera case, according to claim 1, said plate having flanges substantially determining the depth of said guideway, said plate having a shape substantially conforming with said raised border portion of said rectangular opening and said flanges fitting within said raised border portion for preventing displacement of said plate.

3. In a camera case, according to claim 2, said plate having an abutment on one of its edges and having a cut-out on the edge opposite to said abutment, said abutment fitting over one edge of said opening in said top and said cut-out being engaged by said bent tongue on said top for keeping said plate in place.

4. In a camera case, according to claim 3, said plate having slots and spring means secured in said slots for holding said foot portion of said accessory in said guideway.

5. In a camera case, according to claim 4, said spring means consisting of leaf springs, said leaf springs having one T-shaped end for holding said springs in said slots in said plate permanently after said plate has been secured to said top.

6. In a camera case, according to claim 1, said raised border portion having downwardly directed projections and said camera top consisting of substantially elastic material for holding said foot portion of said accessory in said guideway without play.

7. A camera comprising a case having a side wall and a top, a rectangular opening in said top and a rectangular plate located inside said case, said plate having flanges on at least two edges thereof engaging said top for spacing said plate therefrom, said plate being spaced apart from said top below said opening, said plate being anchored to said case providing between said top and said plate within the boundaries of said case a shoe for receiving the foot of a camera accessory.

8. A camera comprising a case having a side wall and a top, a rectangular opening in said top and a rectangular plate located inside said case, said plate being spaced apart from said top below said opening, said plate being anchored to said case providing between said top and said plate within the boundaries of said case a shoe for receiving the foot of a camera accessory, and said case having a recess arranged at a right angle with said opening in said wall, said recess forming an entrance for admitting the foot of said accessory to said shoe.

9. A camera, according to claim 8, said plate having a tab, said tab engaging an edge of said recess.

10. A camera comprising a case having a side wall and a top, a rectangular opening in said top and a rectangular plate located inside said case, said plate being spaced apart from said top below said opening, said plate being anchored to said case providing between said top and said plate within the boundaries of said case a shoe for receiving the foot of a camera accessory, said plate having slots, and spring means held in place by said slots for engaging said accessory foot received in said shoe.

11. In the top of a camera case, a U-shaped opening, an accessory shoe in said opening, said shoe comprising a parallel plate fixed below said top, and spring means on said plate for holding an accessory foot between said spring means and said top, said plate having upwardly bent flanges at least on two opposite edges thereof, said flanges engaging said top for locating said plate in a parallel relationship below said top.

References Cited in the file of this patent
UNITED STATES PATENTS
2,910,573    Bing ------------------ Oct. 27, 1959